(12) United States Patent
Park

(10) Patent No.: US 10,650,196 B2
(45) Date of Patent: May 12, 2020

(54) COMMUNICATION ASSISTIVE DEVICE AND COMMUNICATION ASSISTIVE METHOD OUTPUTTING AN AUDIBLE SENTENCE BASED ON TOUCH SCREEN IMAGE SELECTIONS COMPRISING POSTPOSITIONS

(71) Applicant: Jung Eun Park, Seoul (KR)

(72) Inventor: Jung Eun Park, Seoul (KR)

( * ) Notice: Subject to any disclaimer, the term of this patent is extended or adjusted under 35 U.S.C. 154(b) by 13 days.

(21) Appl. No.: 15/750,544

(22) PCT Filed: Aug. 16, 2016

(86) PCT No.: PCT/KR2016/008987
§ 371 (c)(1),
(2) Date: Feb. 6, 2018

(87) PCT Pub. No.: WO2017/026874
PCT Pub. Date: Feb. 16, 2017

(65) Prior Publication Data
US 2018/0260391 A1 Sep. 13, 2018

(30) Foreign Application Priority Data
Aug. 13, 2015 (KR) .................. 10-2015-0114567

(51) Int. Cl.
*G06F 3/16* (2006.01)
*G10L 13/033* (2013.01)
(Continued)

(52) U.S. Cl.
CPC .......... *G06F 40/51* (2020.01); *G06F 3/04817* (2013.01); *G09B 19/04* (2013.01);
(Continued)

(58) Field of Classification Search
CPC ..... G06F 3/167; G06F 3/04886; G10L 13/033
(Continued)

(56) References Cited

U.S. PATENT DOCUMENTS 7,603,621 B2 * 10/2009 Toyama ........... G06Q 10/06311
715/707
8,065,154 B2 * 11/2011 Schindler .............. G10L 13/033
704/260
(Continued)

FOREIGN PATENT DOCUMENTS

KR 10-2005-0066675 A 6/2005
KR 10-2005-0092293 A 9/2005
(Continued)

OTHER PUBLICATIONS

E.J. Hwang, E.S. Lee, T.S. Hur, Y.S. Woo, and H.K. Min, Implementation of AAC based on Symbols for the Non-Speaking Persons, http://www.dbpia.co.kr/Article/NODE02177392, Conference Papers of Korea Information Science Society, Feb. 2003, 1249-1253, Republic of Korea.

*Primary Examiner* — Farzad Kazeminezhad
(74) *Attorney, Agent, or Firm* — KORUS Patent, LLC; Seong Il Jeong

(57) ABSTRACT

A communication assistive device and a communication assistive method for people with language disorder are provided. The communication assistive method comprises the steps of: receiving user touch screen input selecting one of images representing sentence components displayed on a screen, the sentence components such as words and postpositions constituting a sentence to be outputted; combining the received sentence components to generate a sentence; and outputting the generated sentence by voice, wherein input for at least one of the sentence components is performed by selection of an image coding a shape or meaning of a character, wherein a widget is created for the generated sentence.

9 Claims, 12 Drawing Sheets

(51) Int. Cl.
*G06F 3/0488* (2013.01)
*G06Q 10/06* (2012.01)
*G06F 40/51* (2020.01)
*G09B 19/04* (2006.01)
*H04M 1/725* (2006.01)
*G06F 3/0481* (2013.01)
*G10L 15/18* (2013.01)
*G10L 13/00* (2006.01)

(52) U.S. Cl.
CPC ..... *G10L 15/1822* (2013.01); *H04M 1/72588* (2013.01); *G10L 13/00* (2013.01); *H04M 1/72552* (2013.01)

(58) Field of Classification Search
USPC .................................................. 704/271, 260
See application file for complete search history.

(56) References Cited

U.S. PATENT DOCUMENTS

| | | | | |
|---|---|---|---|---|
| 9,183,655 B2* | 11/2015 | Baker | ................. | G06F 3/04886 |
| 2011/0257977 A1* | 10/2011 | Greenberg | .............. | G06F 3/167 |
| | | | | 704/271 |
| 2013/0304457 A1* | 11/2013 | Kang | ..................... | G10L 13/00 |
| | | | | 704/201 |

FOREIGN PATENT DOCUMENTS

| KR | 10-2008-0063947 A | 7/2008 |
|---|---|---|
| KR | 10-1151865 B1 | 5/2012 |

* cited by examiner 1. ing
2. ed
3. let's
4. body
5. thing
6. and
7. or
8. because
9. so
10. but
11. also
12. again
13. often
14. only
15. with
16. still
17. too
18. all
19. some
20. every
21. any

FIG. 6B

COMMUNICATION ASSISTIVE DEVICE AND COMMUNICATION ASSISTIVE METHOD OUTPUTTING AN AUDIBLE SENTENCE BASED ON TOUCH SCREEN IMAGE SELECTIONS COMPRISING POSTPOSITIONS

TECHNICAL FIELD

The present disclosure relates to a communication assistive device and method.

BACKGROUND OF THE INVENTION

There have been studies for communication assistive methods and devices for language learners and people with language disorder.

However, existing technologies have problems that it is difficult to provide differentiated assistance according to the language level and characteristics of individual users. Further, only a limited number of predetermined sentences were provided to be used.

SUMMARY

The embodiments of the present disclosure provide a communication assistive device and method for receiving input for sentence components, such as a postposition, preposition, connective or conjugation of ending, via images representing the sentence components, generating a sentence, and output the generated sentence by voice.

To achieve the above-described technical objective, a communication assistive method may be provided comprising the steps of: receiving input selecting one of images representing sentence components displayed on a screen, the sentence components constituting a sentence to be outputted; combining the received sentence components to generate a sentence; and outputting the generated sentence by voice, wherein input for at least one of the sentence components is performed by selection of an image coding a shape or meaning of a character.

BRIEF DESCRIPTION OF DRAWINGS

FIG. 6b shows exemplary images for conjugation of endings and connectives when the language is English according to an embodiment.

DETAILED DESCRIPTION

Figure 1:
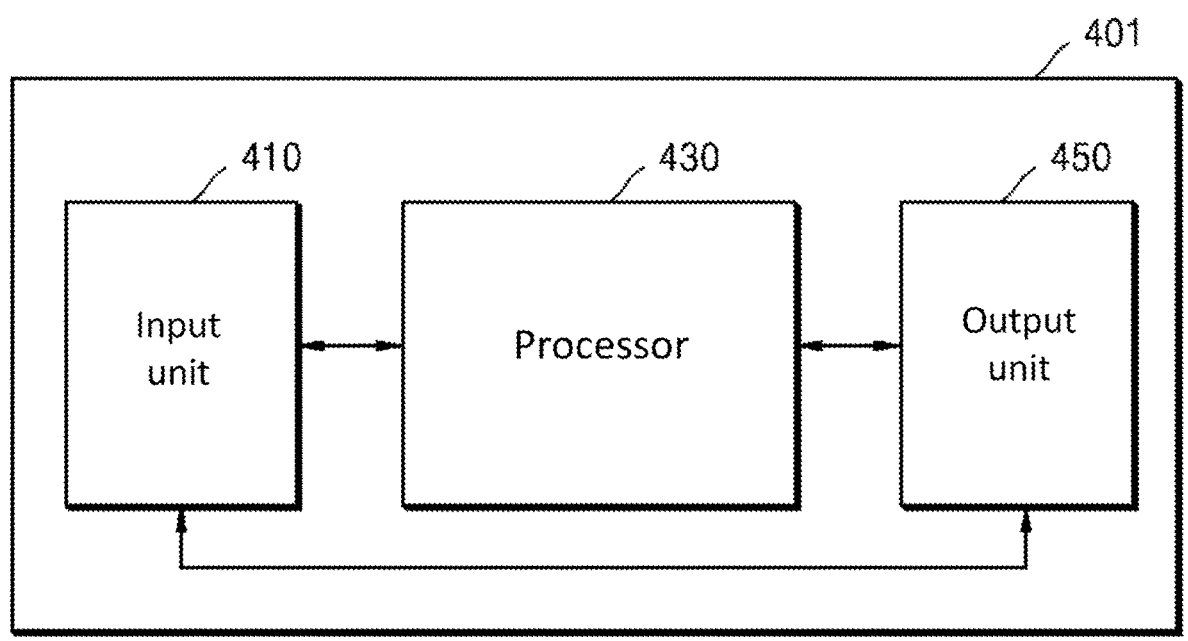
FIG. 1 is a schematic block diagram of a communication assistance device according to one embodiment.

According to an aspect of an embodiment of the present invention to achieve the above-mentioned technical objective, a communication assistive method may be provided comprising the steps of: receiving input selecting one of images representing sentence components displayed on a screen, the sentence components constituting a sentence to be outputted; combining the received sentence components to generate a sentence; and outputting the generated sentence by voice, wherein input for at least one of the sentence components is performed by selection of an image coding a shape or meaning of a character.

According to another aspect of an embodiment of the present invention, a communication assistive device may be provided comprising an input unit for receiving input selecting one of images representing sentence components displayed on a screen, the sentence components constituting a sentence to be outputted; a processor for combining the received sentence components to generate a sentence; and an output unit for outputting the generated sentence by voice, wherein input for at least one of the sentence components is performed by selection of an image coding a shape or meaning of a character.

According to another aspect of an embodiment of the present invention, a computer-readable recording medium storing a program performing, when read and executed by a processor, a communication assistive method, comprising the steps of: receiving input selecting one of images representing sentence components displayed on a screen, the sentence components constituting a sentence to be outputted; combining the received sentence components to generate a sentence; and outputting the generated sentence by voice, wherein input for at least one of the sentence components is performed by selection of an image coding a shape or meaning of a character.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Reference will no be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, the present specification is drafted with reference to the accompanying drawings, in which various embodiments are shown. However, it is not desired that the techniques disclosed in the present specification are limited to specific carry-out aspects, and it will be understood that various modifications, equivalents, and/or alternatives are also included in the contents of the present specification. In the description of the drawings, like reference numerals may refer to like elements.

The terms used in this specification are those general terms currently widely used in the art, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the specification should be understood not as simple names but based on the meaning of the terms and the overall description.

In addition, the term ' . . . unit' used in the embodiments indicates a component including software or hardware, such as a Field Programmable Gate Array (FPGA) or an Application-Specific Integrated Circuit (ASIC), and the ' . . . unit' performs certain roles. However, the ' . . . unit' is not limited to software or hardware. The ' . . . unit' may be configured to be included in an addressable storage medium or to reproduce one or more processors. Therefore, for example, the ' . . . unit' includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and ' . . . units' may combine them into a smaller number of components and ' . . . units' or further divide them into additional components and ' . . . units'.

In the present specification, a mobile device indicates a relatively small-sized computer device which is portable by a user, and may include, for example, a cellular phone, a personal digital assistant (PDA), or a laptop computer.

In the present specification, the expression "have", "may have", "include", or "may include" indicates the existence of corresponding features (for example, numeric values, functions, operations, or components of parts) and does not exclude the existence of an additional feature.

In the present specification, the expression "A or B", "at least one of A or/and B", or "one or more of A of/and B" may include all possible combinations of listed items. For example, "A or B", "at least one of A or/and B", or "one or more of A or/and B" may indicate (1) a case of including at least one of A, (2) a case of including at least one of B, or (3) a case of including all of at least one of A and at least one of B.

The expressions, such as "first" and "second", used in the present specification can be used to describe various elements without regarding to sequence and/or importance and do not limit corresponding elements but are used only to classify a certain element from another element. For example, first user equipment and second user equipment may indicate different pieces of user equipment without regard to sequence or importance. For example, a first element may be referred to as a second element without going beyond the right scope of the present specification, and likewise, the second element may be referred to as the first element.

When it is described that a certain element (e.g., a first element) is "(operatively or communicatively) coupled with/ to" or "connected to" another element (e.g., a second element), it should be understood that the certain element may be connected to another element directly or via another element (e.g., a third element) in the middle. In contrast, when a certain element (e.g., a first element) is "directly connected" or "directly linked" to another element (e.g., a second element), it should be understood that any other element (e.g., a third element) does not exist in the middle.

The expressions "configured to" used in the present specification may be replaced with, for example, "suitable for", "having the capacity to", "designed to", adapted to", "made to", or "capable of" in accordance with circumstances. The term "configured to" does not necessarily indicate only "specifically designed to" in the hardware meaning. Instead, the expression "device configured to" may indicate the device "capable of together with other devices or parts. For example, the wording "processor configured to perform A, B, and C" may indicate an exclusive processor (e.g., an embedded processor) for performing corresponding operations or a generic-purpose processor (e.g., a central processing unit (CPU) or an application processor) capable of performing corresponding operations by executing one or more software programs stored in a memory device.

In the present specification, a sentence component may not refer to a general sentence component indicating a subject, a predicate, an object, a complement, a modifier, etc., but may refer to each of the basic words constituting a sentence and conjugations of endings connected to the basic words. In this specification, a sentence component may include an idiomatic form or a phrase form in which a plurality of sentence components are combined.

In this specification, each of the basic words constituting a sentence may include a basic and/or conjugated form of noun, pronoun, verb, auxiliary verb, postposition, preposition, adjective, adverb, numeral, interjection, and connective.

In this specification, each of the basic words constituting a sentence may vary depending on the languages. For example, if the used language is Korean, a preposition may not be used, but if it is English, a preposition may be used.

For further example, if the used language is Korean, the sentence, '나는 학교에 가고 싶다' has the sentence components, and '나', '는', '학교', '에', '가다', and '싶다.'

On the other hand, if the used language is English, the sentence, 'I go to school' may have four sentence components of 'I,' 'go,' 'to,' and 'school.' In addition, the sentence, 'I am going to school' may have six sentence components of 'I,' 'am,' 'go,' '~ing,' 'to,' and 'school.' Further, the sentence, 'I went to school' may have five sentence components of 'I,' 'go,' '~ed,' 'to,' and 'school.'

In another example, the sentence 'I am going to school' may be interpreted as having five sentence components of 'I,' 'am,' 'going,' 'to,' and 'school,' and the sentence 'I went to school' may be interpreted as having four sentence components of 'I,' 'went,' 'to,' and 'school.' This means that 'go' and may be interpreted as separate sentence components, or as a single sentence component of 'going.' Also, 'went' may be interpreted as separate sentence components of 'go' and '~ed', or as a single sentence component of 'went.'

In another example, the sentence, 'I am going to school' may be interpreted as having two sentence components of 'I am going to' and 'school'.

In the present specification, the term, 'conjugation of ending' may refer to the portion that is added to the basic form of a word to provide additional meaning. For example, the conjugation of ending may include an ending indicating the tense and/or an ending indicating the number. For example, the conjugation of ending may include '~ing,' '~ed,' 'let's,' etc. in English.

In the present specification, the connectives may include a word used to connect the forms and/or meanings of words, phrases, or sentences, such as, 'and', 'also', 'or,' 'again,' 'because,' 'so,' and 'but.'

In this specification, the conjugated forms of nouns, pronouns, verbs, auxiliary verbs, postpositions, prepositions, adjectives, adverbs, numerals, interjections, and connectives may refer to the modified forms of the of nouns, pronouns, verbs, auxiliary verbs, postpositions, prepositions, adjectives, adverbs, numerals, interjections, and connectives, which change or expand the form or the meaning.

The examples in this specification may be examples for a particular language, but the scope of the present disclosure is not limited to the language used as an example, and may be applied to various languages.

The terms used herein are merely used for the purpose of describing particular embodiments and do not limit the scope of other embodiments of the present disclosure. As used herein, singular forms of terms may include plural forms as well, unless the context clearly indicates otherwise. Unless defined otherwise, all terms used herein, including technical and scientific terms, have the same definitions as those commonly understood by a person of ordinary skill in the art to which the present disclosure pertains. Such terms as those defined in a generally used dictionary may be interpreted to have the same definitions as the contextual definitions in the relevant field of art, and are not to be interpreted to have ideal or excessively formal definitions, unless clearly defined in the present disclosure. In some cases, even terms defined in the present disclosure should not be interpreted in a manner that excludes embodiments of the present disclosure.

A communication assistive device according to embodiments of the present disclosure may include at least one of, for example, a smart phone, a tablet PC, a mobile phone, a video phone, an electronic book reader (e-book reader), a desktop PC, a laptop PC, a netbook computer, a workstation, a server, a PDA, a portable multimedia player (PMP), a MPEG-1 audio layer-3 (MP3) player, a mobile medical device, a camera, and a wearable device. According to various embodiments, the wearable device may include at least one type of accessory (e.g., a watch, a ring, a bracelet, an anklet, a necklace, glasses, a contact lens, or a head-mounted device (HMD)), a fabric or clothing integrated type (e.g., an electronic clothing), a body-mounted accessory (e.g., a skin pad, or tattoo), and a bio-implantable accessory (e.g., an implantable circuit).

In various embodiments, the communication assistive device may be the various devices described above, taken alone or in combination. According to a certain embodiment, the communication assistive device may be a flexible electronic device. In addition, the communication assistive device according to an embodiments of the present specification is not limited to the devices described above and may include new electronic devices along with the development of technology.

Hereinafter, a communication assistive device according to various embodiments is described with reference to the accompanying drawings. In the present specification, the term "user" may indicate a person using the communication assistive device or a device (e.g., an artificial intelligence (AI) electronic device) using the communication assistive device.

FIG. 1 is a schematic block diagram of a communication assistance device according to one embodiment. The communication assistance device 401 may include the input unit 410, the processor 430, and the output unit 450.

The input unit 410 may receive an input for each of the sentence components via selection of one of the images representing the sentence components displayed on the screen. The image representing the sentence component may be an image representing the corresponding sentence component or its meaning, or may be a code that simplifies the shape of the letters. An image representing a sentence component may be created, modified, and deleted by the user.

For example, an image representing a noun for a food name, an animal name, a name for a body part, etc. may be a picture or a photo representing the noun, and an image representing a verb and adjective for emotion or motion expression may be a picture or a photo representing its meaning. Further, an image representing some sentence components such as postposition, postposition, conjugation of ending, connective, etc. may be images obtained by simplifying or coding the shape and meaning of letters. An example of an image obtained by coding some sentence components will be described later with reference to FIGS. 5a, 5b, 5c, 6a, and 6b.

The input unit 410 can receive user input through various methods such as dragging, touching, clicking, and sensing through various input devices such as a touch screen, a mouse, a touch pad, a keyboard, and a sensor.

The processor 430 may combine the sentence components received through the input unit 410 to generate a sentence. A sentence may mean a natural language used in ordinary life. Details will be described later with reference to FIGS. 7a and 7b.

The output unit 450 can output a sentence generated by the processor 430 by voice. The outputted voice may be selected from various voice types, such as a woman, a man, a child, and an elderly person. Also, the output unit 450 can adjust the output speed of the voice.

In the present embodiment, the input unit 410, the processor 430, and the output unit 450 are shown as separate configuration units, but according to some embodiments, the input unit 410, the processor 430, and the output unit 450 may be combined and implemented as the same configuration unit.

In addition, although the input unit 410, the processor 430, and the output unit 450 are shown as separate configuration units adjacently located inside the communication assistive device 401 in the present embodiment, devices taking charge of respective functions of the input unit 410, the processor 430, and the output unit 450 do not have to be necessarily physically adjacent to each other, and thus, the input unit 410, the processor 430, and the output unit 450 may be distributed according to embodiments.

In addition, since the communication assistive device 401 is not limited to a physical device, some functions of the communication assistive device may be implemented by software instead of hardware.

Figure 2:
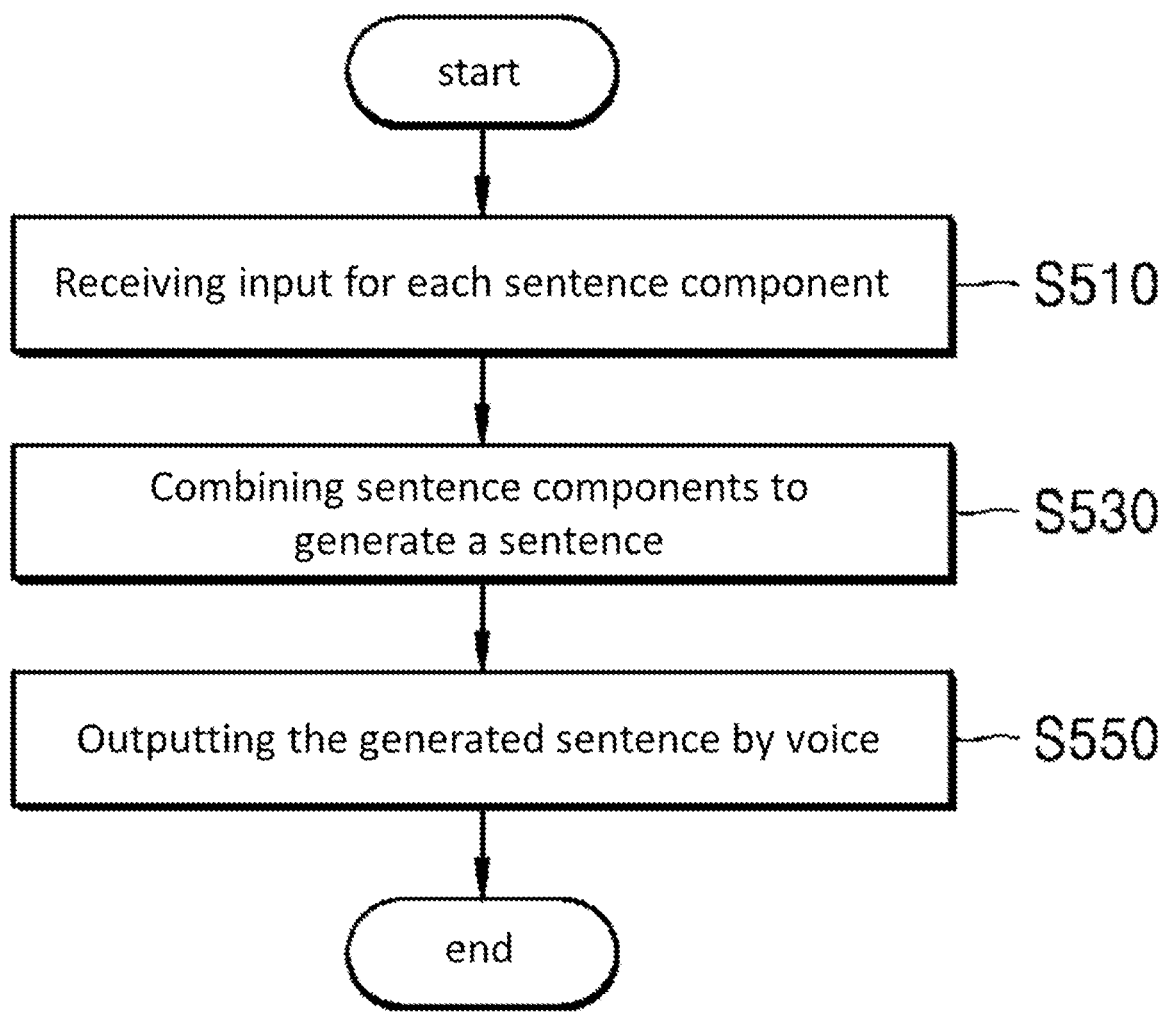
FIG. 2 is a flow diagram of a communication assistive method in accordance with one embodiment.

FIG. 2 is a flow diagram of a communication assistive method in accordance with one embodiment.

In step S510, the communication assistive device 401 may receive an input for each sentence component. The communication assistive device 401 may receive inputs for the sentence components including a basic form and a conjugated form of noun, pronoun, verb, auxiliary verb, postposition, preposition, adjective, adverb, numeral, interjection, and connective, along with conjugation of ending, in a consecutive manner.

In the present disclosure, the communication assistive device 401 may separately receive inputs of postpositions, numerals, connectives, and conjugations of endings as sentence components such that the communication assistive device 401 may not only assist communication, but also assist children or foreigners to systematically learn the grammar of a language.

The communication assistive device 401 may receive an input for each sentence component via selection of an image representing each sentence component. An image representing each sentence component is provided by default, but it may be replaced with an image that a user can use more easily.

In an embodiment, the user may add a new image representing the sentence component in addition to the image provided by default.

In an embodiment, the user may delete a sentence component that is not used well among the sentence components that are provided by default.

In an embodiment, an advanced user may use the characters of the language in which the user wishes to communicate instead of using an image representing the sentence component. Through this function, the communication assistive device 401 may be used in different manners depending on the ability of the user.

In step S530, the communication assistive device 401 may combine the sentence components to generate a sentence.

The communication assistive device 401 may combine the sentence components, which were input individually, to generate a sentence that may be natural used in an actual life.

In an embodiment, the communication assistive device 401 may receive a selection for one of the recently generated sentence lists to create a widget. The widget may output a voice as soon as it is clicked, without running the application. The user can quickly make a language response by installing the widget of one or more frequently used sentences on the home or default screen of the cellular phone.

In an embodiment, the communication assistive device 401 may store a history of the generated sentence to provide a list of recently used sentences, a list of most frequently used sentences, and the like.

In step S550, the communication assistive device 401 may output the generated sentence by voice. The outputted voice may be in a voice type selected from various ones, such as a woman, a man, a child, and an elderly person. The volume of the outputted voice may also be selected.

Figure 3:
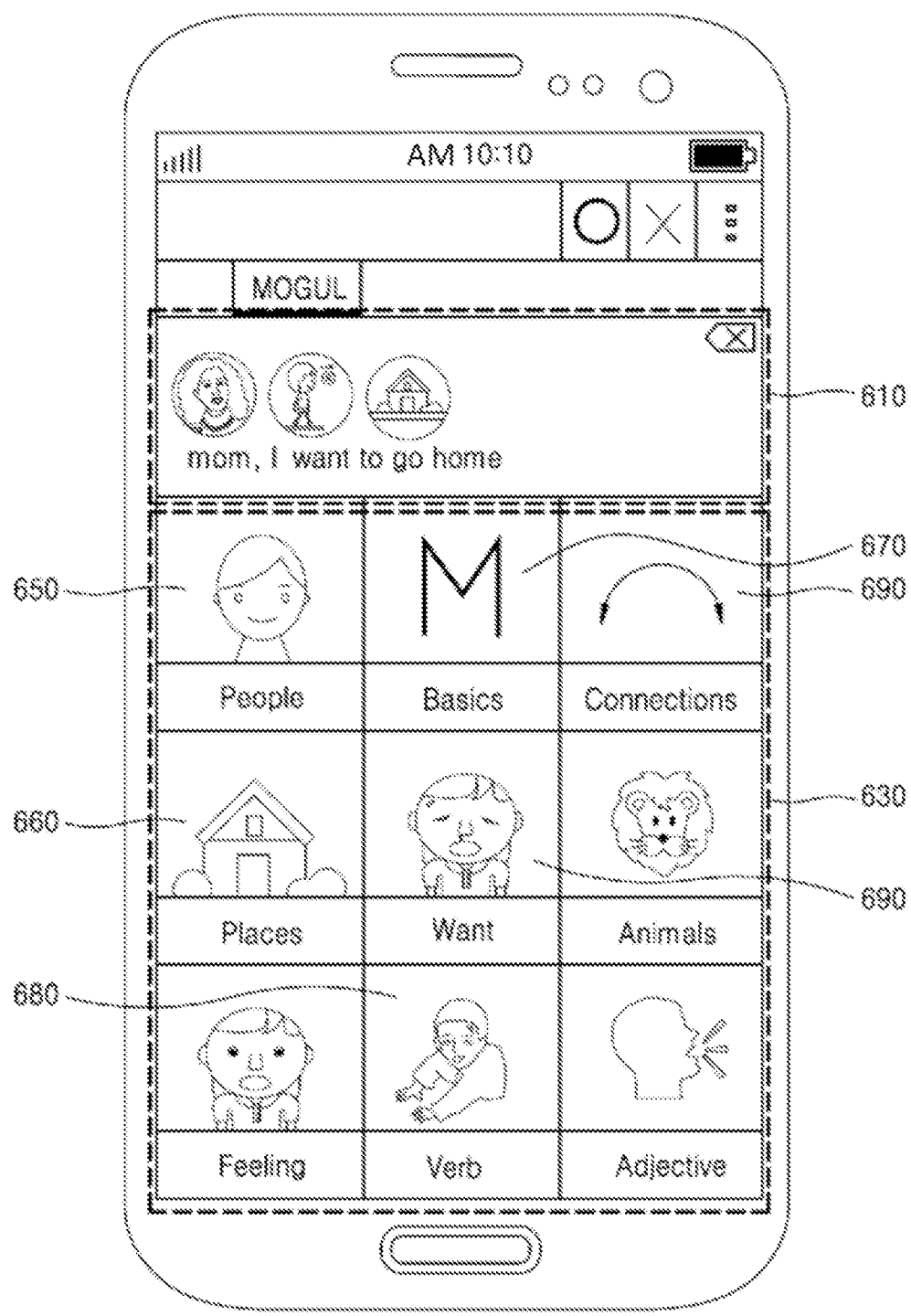
FIG. 3 is an exemplary screenshot in case of implementation of a communication assistive method in accordance with one embodiment.

FIG. 3 is an illustration of a communication assistive method in accordance with one embodiment. The communication assistive method of FIG. 2 may be implemented in a form of an application. Communication assistive applications may be installed on various mobile devices.

As in the present embodiment, the communication assistance application may be installed in a cellular phone. The home screen of the application may include a sentence generation part 610 and a sentence component part 630.

When the user selects a specific sentence component in the sentence component part 630, the communication assistive device 401 may display the selected sentence component together with the meaning in the sentence generation part 610.

The sentence component part 630 may have a plurality of categories. In one embodiment, the sentence component part 630 may have categories such as people, postpositions, conjugation of endings, places, emergencies, animals, moods, behaviors, adjectives, and connectives.

For example, when a user wants to say 'mom, I want to go home', the user may select 'mom' as a detail item in the "People" category 650 of the sentence composition part 630, select 'I' in the pronoun category, select 'want to go' in the "Want" category 690, and then select 'home' as a detail item in the "Places" category 660.

In another embodiment, when the user wishes to say 'mom, I want to go home,' the user may select 'mom' as a detail item in the "People" category 650 of the sentence composition part 630, select 'I' in the pronoun category, select 'want' in the "Verb" category 680, select 'to' in the "Basics" category 670, select 'go' in the "Verb" category 680, and then select 'home' as a detail item in the "Places" category 660.

In another embodiment, when the user wishes to say 'mom, I want to go home,' the user may select 'mom' a detail item in the "People" category 650 of the sentence component part 630, select the phrase, 'I want to go' in the "Want" category 690, and then select 'home' as a detail item in the "Places" category 660.

The sentence generation part 610 may display the sentence components inputted by the user in the order that they are inputted. In an embodiment, the sentence generation part 610 may generate a sentence to be naturally used in an actual life by modifying some sentence components by using connectives, based on the sentence components inputted by the user.

The layout and configuration of such an application is merely exemplary, and the application may be implemented in various other forms. The sentence component part 630 may further include various categories, such as plants, foods, moods, friends, etc. in addition to the illustrated categories.

The arrangement order of these categories may be determined automatically according to the frequency of use, or may be manually determined according to the user's selection. The user's parent may also use the locking feature to prevent the category order from being altered.

In an embodiment, a user-specific category may be created to include a sentence component that is mainly used by the user as a component of the corresponding user category.

In an embodiment, a category may be modified, added, or deleted by a user. For example, a parent of a person with language disability or a child may modify, add, or delete categories based on the use of the person with language disability or the child.

In an embodiment, the application may include camera function. The user may modify or add a category by using the camera function.

Figure 4:
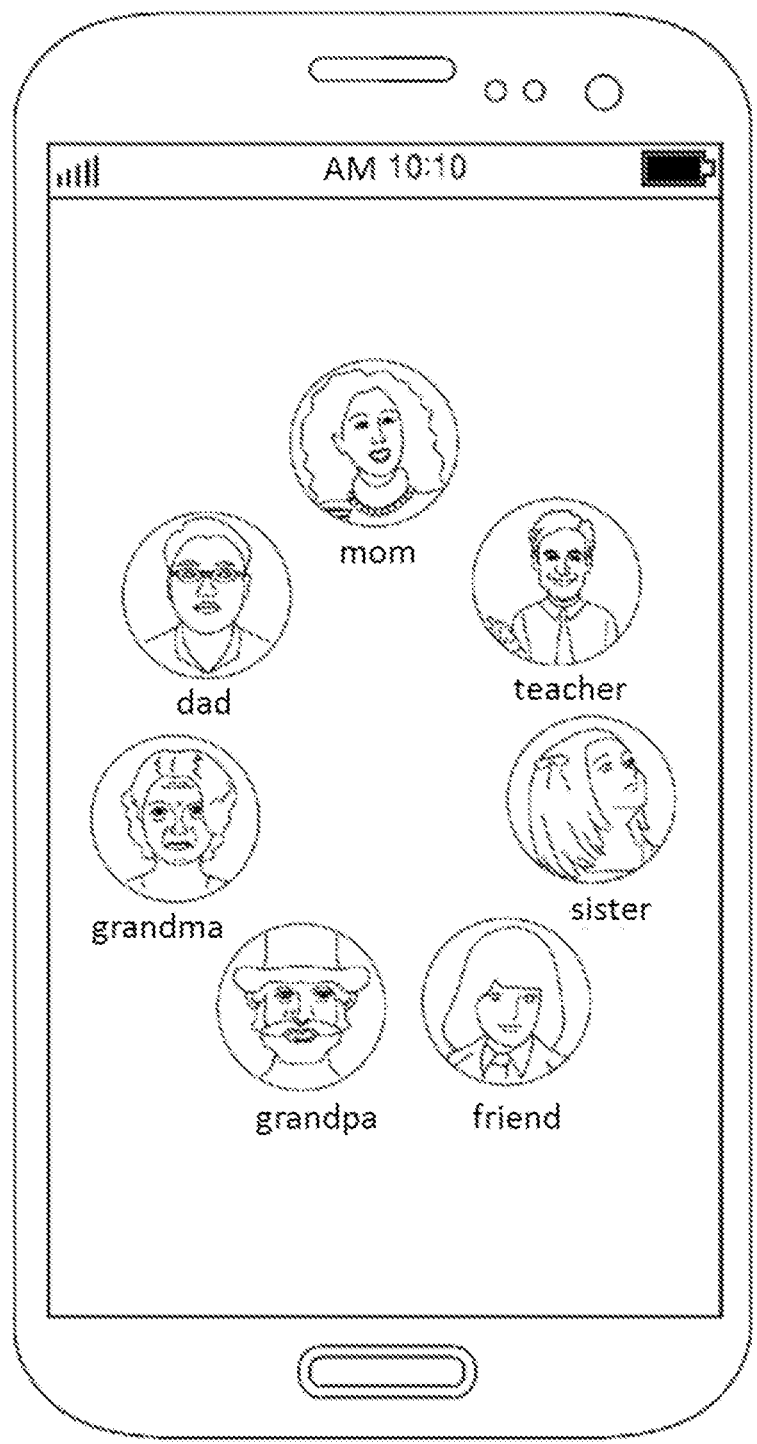
FIG. 4 is an exemplary screenshot in case of an implementation of a communication assistive method in accordance with one embodiment.

FIG. 4 shows an implementation of a communication assistive method in accordance with one embodiment. This is an example of a screen displayed when the "People" category 650, which is one of the categories of the sentence component part 630 of FIG. 3, is selected.

The "People" category 650 may include types of person, such as a father, a mother, a grandmother, a grandfather, a friend, a sibling, a teacher, and/or etc.

Each type of person may displayed by a default image, but it may be replaced with an actual photo of a person whom the user photographed using the camera function. By using an 'Add' button, a user may also add a new type of person by the camera function. For example, a user may take a photo of a new friend and add it as a new type of person using the 'Add' button. The order in which each detail item is displayed may be determined automatically based on the frequency of use, or may be manually determined by receiving the user's input.

In FIG. 4, the types of person, which are detail items of the category, are displayed in the form of a circle, but this is merely an example, and may be displayed in various forms rather than a circle. In an embodiment, the communication assistive device 401 may be able to add a new personal category using the camera function, keyboard function, or etc. of the communication assistive device 401.

Figure 5A:
FIG. 5a shows exemplary images representing postpositions when the language is Korean according to one embodiment.

FIG. 5a shows exemplary images representing postpositions when the language is Korean according to one embodiment. An image representing a postposition may be an image obtained by simplifying and coding the shape and meaning of a character. The image representing the postposition may be determined in consideration of ease of use, ease of understanding, and intuitiveness.

For example when the language is Korean, the image for the postposition of "~이" may be 810 that has the same shape as the character "~이." Further, the image for the postposition of "~가" may be 830, which is a simplified image using the dot (i.e., ".") as in Hunminjeongeum. In addition, the image for the postposition of "~에" may be 850, which is an image expressing the meaning of the character intuitively.

However, the codes or images shown in FIG. 5a are merely examples, and different codes or images may be used for the same postpositions.

Figure 5B:
FIG. 5b shows exemplary images for basic representations when the language is English according to one embodiment.
Figure 5C:
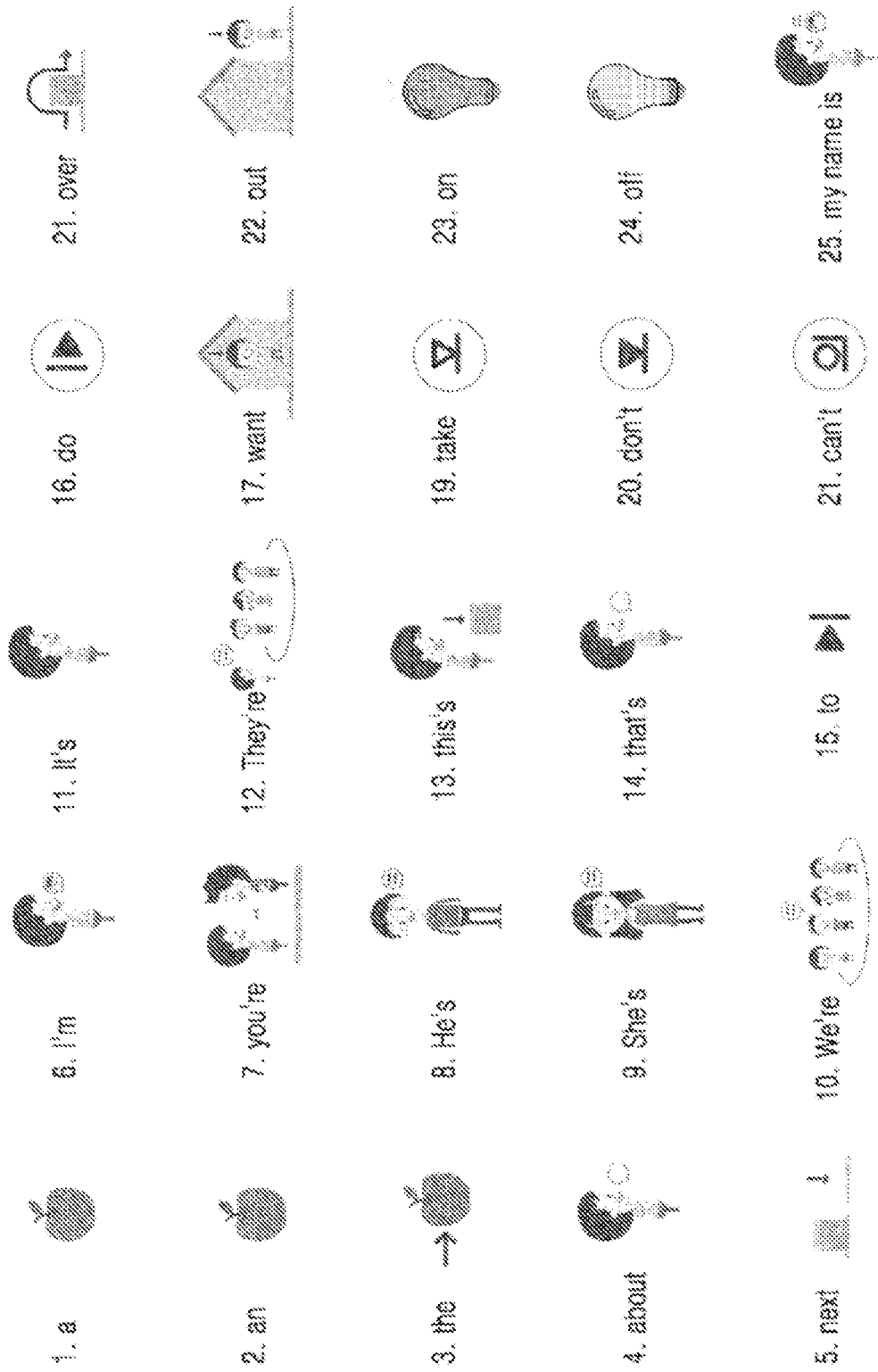
FIG. 5c shows exemplary images for basic representations when the language is English according to one embodiment.

FIGS. 5b and 5c show exemplary images for basic representations when the language is English according to one embodiment. In the embodiment, the basic expressions may include frequently used verbs, auxiliary verbs, numerals, prepositions, phrases having combination of a plurality of sentence components, and etc. The image representing the basic expression of the embodiment may be an image coded by simplifying the shape and meaning of the character. The image representing the basic expression can be determined in consideration of ease of use, ease of understanding, and intuitiveness.

However, the codes or images shown in FIGS. 5b and 5c are merely examples, and other codes may be used for the same postposition.

Figure 6A:
FIG. 6a shows exemplary images for conjugation of endings when the language is Korean according to an embodiment.

FIG. 6a shows exemplary images for conjugation of endings when the language is Korean according to an embodiment. The image representing the conjugation of ending may be an image coded by simplifying the shape and meaning of the character. The image representing the conjugation of ending may be determined in consideration of ease of use, ease of understanding, and intuitiveness.

The image may be determined by simplifying the meaning of the character. For example, the image for "~이다," "~이에요" (meaning 'it is') may be 910, and the image for "아니다" (meaning 'it is not') may be 930. In addition, the images for "있어요" (meaning 'there is'), "없어요" (meaning 'there is not'), "하고 있어요" (meaning 'doing it'), and "하자" (meaning 'let's') may be determined as , , , and , respectively, by simplifying the meaning of each character intuitively.

However, the codes or images shown in FIG. 6a are merely examples, and other codes may be used for the same conjugation of ending. Also, various conjugation of endings not shown in FIG. 6a may be added.

FIG. 6b shows exemplary images for conjugation of endings and connectives when the language is English according to an embodiment. The image representing the conjugation of ending and the connective may be an image coded by simplifying the shape and meaning of the character. The image representing the conjugation of ending may be determined in consideration of ease of use, ease of understanding, and intuitiveness.

For example, the connectives may include words such as 'and,' 'also,' 'or,' 'again,' 'because,' 'so,' and 'but' as shown in FIG. 6b. At this time, the image representing 'and' may be an image expressing the meaning of the letter intuitively as . Also, for example, as shown in FIG. 6b, the conjugation of endings may include '~ing,' '~ed,' and 'let's,' and the images representing them may be , , and , respectively, expressing the meaning of the letter intuitively. However, the codes or images shown in FIG. 6b are merely examples, and other codes may be used for the same conjugation of ending or connective. Also, various conjugation of endings and connectives not shown in FIG. 6b may be added.

In an embodiment, images representing connectives and conjugations of endings may be output on a screen and then the user's selections of a plurality of images including at least one of the images above may be input. In this embodiment, the communication assistive device 401 may display the sentence components in the inputted order and form. However, when selections of a plurality of images for sentence components are input, and then a predetermined time lapses or additional predetermined input is received, the communication assistive device 401 may generate and output a sentence in which some sentence components are combined, modified, and/or rearranged in their order.

For example, if a user sequentially selects images for the sentence components of 'I,' 'go,' 'to,' and 'school,' the communication assistive device 401 outputs on a screen a sentence, 'I go to school', that is, the sentence generated by arranging the sentence components in the order and type that the images for the sentence components are selected or inputted.

In case the user sequentially selects the images corresponding to the sentence components 'I,' 'am,' 'go,' '~ing,' 'to,' and 'school,' and then a predetermined time lapses or additional predetermined input is received, the communication assistive device 401 may generate and output the sentence of 'I am going to school' in which the sentence components of 'go' and '~ing' are combined and modified.

Further, the user may sequentially input the images representing the sentence components 'I,' 'go,' '~ed,' 'to,' and 'school,' respectively. Or the user may input the images corresponding to 'I,' 'go,' 'to,' and 'school' sequentially while inputting the image for the conjugation of ending '~ed' in an arbitrary order. In both cases above, the communication assistive device 401 may automatically generate and output the sentence of 'I went to school' in which some sentence components are combined (i.e., 'go'+'~ed'), modified (i.e., 'go'+'~ed'→'went'), and/or rearranged in their order (i.e., the order of the '~ed' inputted in an arbitrary order and at least one other sentence components are changed).

On the other hand, when the user sequentially inputs images representing the sentence components of 'go,' 'to,' 'let's,' and 'school,' the communication assistive device 401 may automatically generate and output the sentence "let's go to school" in which some sentence components are rearranged in their order (that is, the output order is changed so that 'let's' is positioned before 'go' and 'to').

Figure 7A:
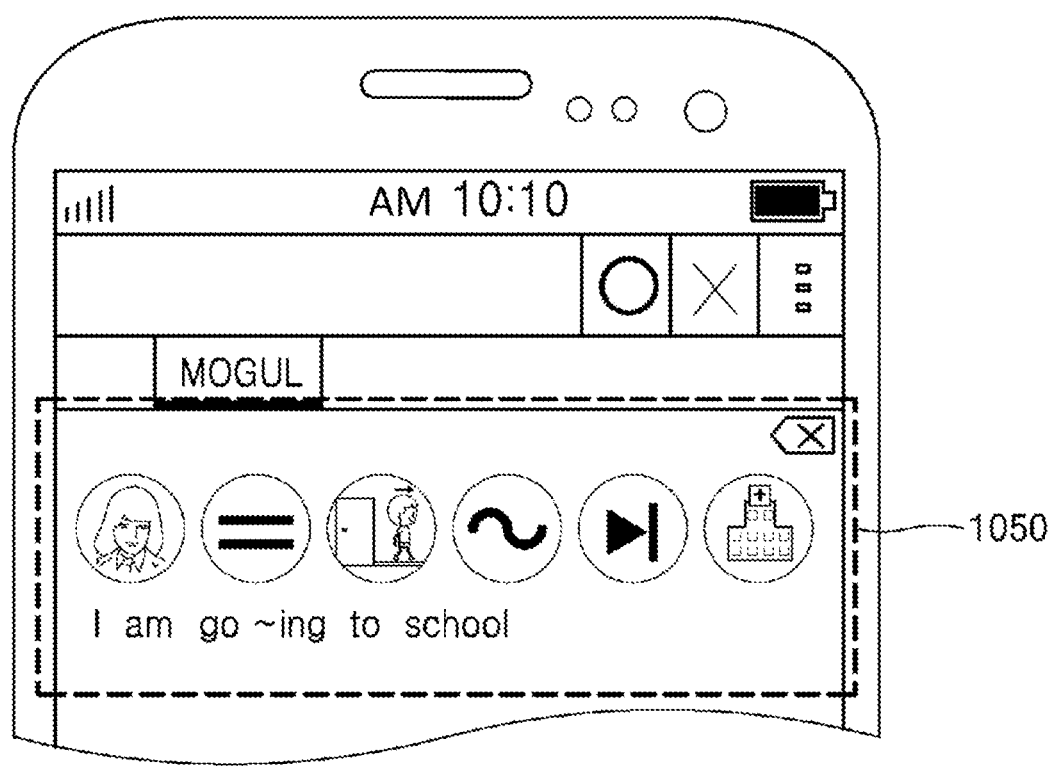
FIG. 7a is an exemplary screenshot for receiving inputs for sentence components according to an embodiment.
Figure 7B:
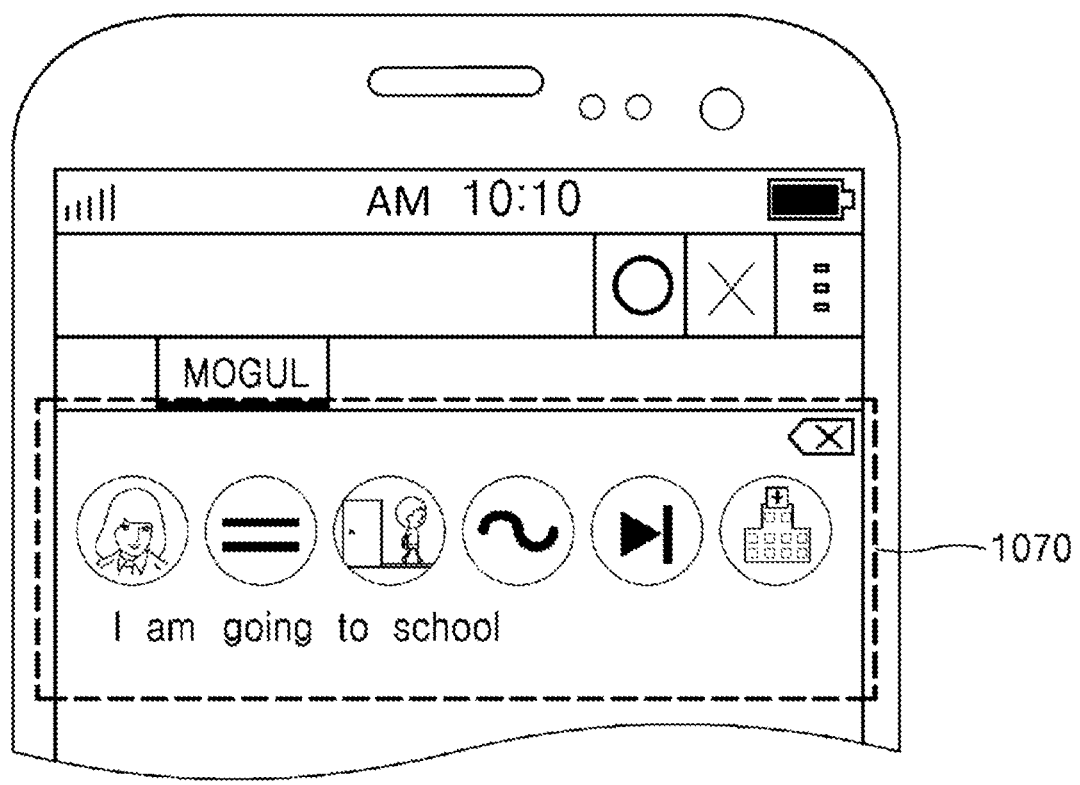
FIG. 7b is an exemplary screenshot for generating a sentence by combining sentence components according to an embodiment.

FIG. 7a is an exemplary screenshot for receiving inputs for sentence components according to an embodiment, and FIG. 7b is an exemplary screenshot for generating a sentence by combining sentence components according to an embodiment.

When the communication assistive device 401 first receives inputs for sentence components, it may display sentence components as they are inputted, for example, as 'I am go ~ing to school' as shown in 1050. However, when the communication assistive device 401 receives the predetermined instruction, it may combine some sentence components to generate the sentence, 'I am going to school' as shown in 1070.

The predetermined instruction may be received in a variety of forms including a button, a specific key of the keyboard, a mouse click, a touch screen touch, and/or etc.

Figure 8:
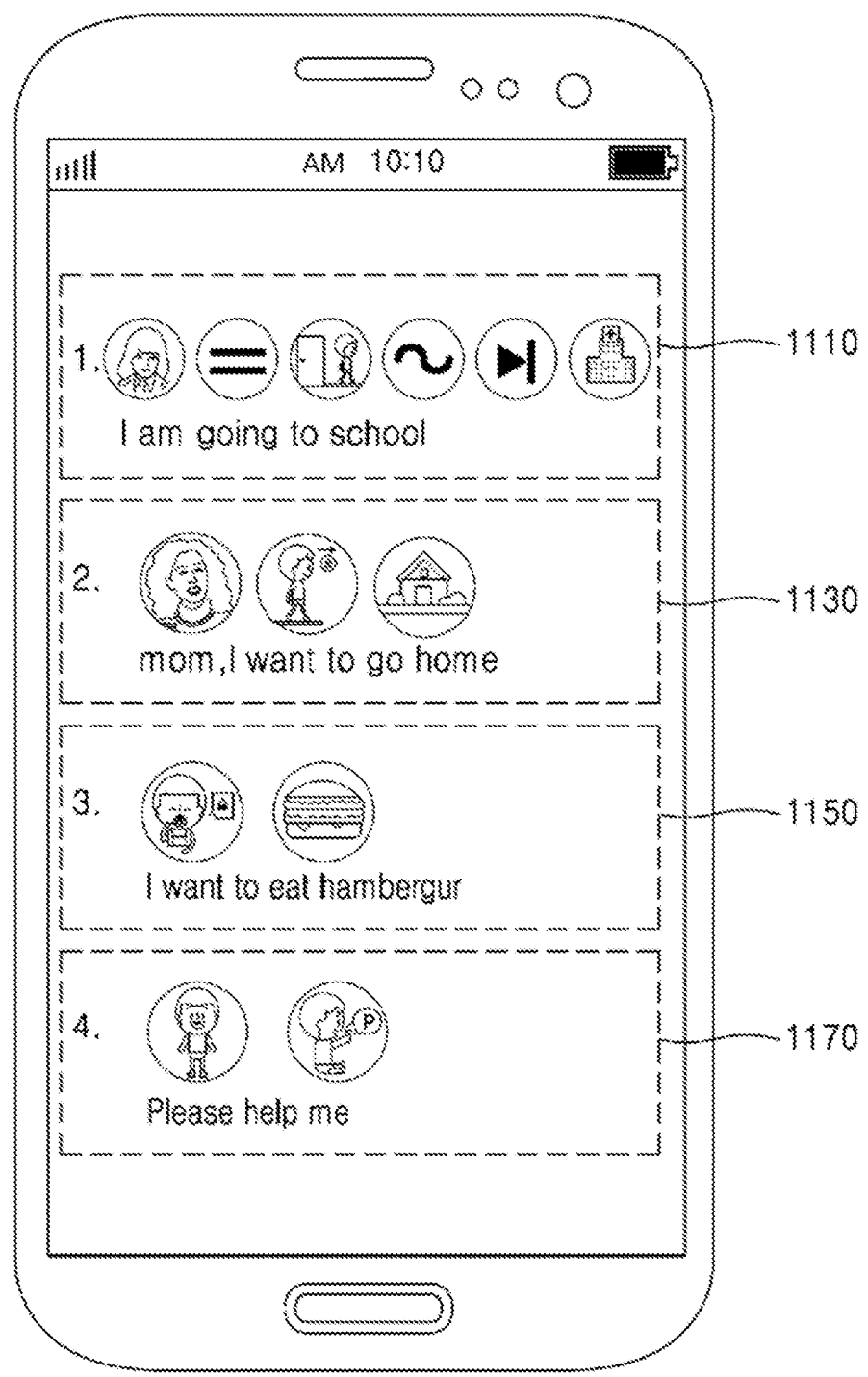
FIG. 8 is an exemplary screenshot displaying a frequently used sentence around a specific place according to an embodiment.

FIG. 8 is an exemplary screenshot displaying a frequently used sentence around a specific place according to an embodiment. The communication assistive device 401 may output a generated sentence by voice, and then store the output location in an internal or external storage device.

The output location may be stored in various forms such as coordinates using latitude and longitude, a location on GPS, a location on administrative area, or etc.

Based on the cumulative data about the place where sentences are stored, the communication assistive device 401 may display the sentences, which were previously output within the predetermined distance from the place where the communication assistive device is currently located, in the order of frequency of use. The previously output sentence may refer to a sentence that has been output within a predetermined period of time.

For example, the communication assistive device 401 may display sentences in the order of frequency of use based on the cumulative data for a zoo. For example, the sentences that were most frequently outputted previously within 10 meters from the zoo may be 'I am going to school' (as shown in 1110), 'mom, I want to go home' (as shown in 1130), 'I want to eat hamburger' (as shown in 1150), and 'Please help me' (as shown in 1170). The communication assistive device 401 may display the above sentences in the order that the most frequently outputted one is displayed first. The sentence may be displayed as one combined with images representing sentence components, such as  .

In an embodiment, the communication assistive device 401 may output the generated sentence by voice and then store the output time in an internal or external storage device.

The output time may be stored in the standard time of the area in which the communication assistive device 401 is located.

The communication assistive device 401 may display the sentences that have been previously output within a predetermined period time from the current time in the order of frequency of use, based on the cumulative data about the stored output times of the sentences. The previously output sentence may refer to a sentence that has been output within a predetermined period of time.

In an embodiment, the communication assistive device 401 may display sentences in a decreasing order of frequency of use based on time in a location where there is no history of use.

In an embodiment, the communication assistive device 401 may display sentences in a decreasing order of frequency of use based on location at the time when there is no history of use.

In another embodiment, the communication assistive device 401 may display sentences in a decreasing order of frequency of use for each conversation partner. For example, sentences frequently used in conversations with a mother may differ from sentences frequently used in conversations with a friend or teacher.

The present embodiments may be implemented by storing computer-readable code in a non-transitory computer-readable storage medium. The non-transitory computer-readable storage medium is any data storage device that can store data that can thereafter be read by a computer system.

The computer-readable code is configured to perform operations implementing a photographing device control method according to an embodiment when the computer-readable code is read, from the non-transitory computer-readable storage medium, and executed by a processor. The computer-readable code may be implemented by various programming languages. Also, functional programs, codes and code segments for embodying the present embodiments may be easily programmed by those of ordinary skill in the art to which the present embodiments belong.

Examples of the non-transitory computer-readable storage medium include ROMs, RAMs, CD-ROMs, magnetic tapes, floppy disks, optical data storage devices, etc. and also include carrier waves (e.g., transmission over the Internet). The non-transitory computer-readable storage medium can also be distributed over a network coupled computer system so that the computer-readable code is stored and executed in distributed fashion.

It should be understood that embodiments described herein should be considered in a descriptive sense only and not for purposes of limitation. Descriptions of features or aspects within each embodiment should typically be considered as available for other similar features or aspects in other embodiments.

Although the present disclosure has been described with various embodiments, various changes and modifications may be suggested to one skilled in the art. It is intended that the present disclosure encompass such changes and modifications as fall within the scope of the appended claims.

The invention claimed is:

1. A communication assistive method comprising the steps of:
   receiving a plurality of user touch screen inputs, each of the plurality of inputs selecting one of images representing sentence components displayed on a screen, the sentence components constituting a sentence to be outputted, wherein the sentence components comprise postpositions, conjugation of endings, and connectives;
   combining, modifying, and/or rearranging the received sentence components to generate a sentence, wherein the received sentence components comprise one or more of the postpositions: and
   outputting the generated sentence by voice, wherein input for at least one of the sentence components is performed by selection of an image coding a shape or meaning of a character, and wherein a widget is created for the generated sentence.

2. The method of claim 1, further comprising:

storing a location where the outputting step is performed; and displaying, in an order of frequency of use, sentences output within a predetermined distance from a location where a communication assistive device is located, based on data on the stored location.

3. The method of claim 2, wherein the displayed sentences include a combination of images representing sentence components.

4. The method of claim 1, wherein the image representing the sentence component is generated, modified, and/or deleted by a user.

5. A communication assistive device comprising:

an input unit for receiving a plurality of user touch screen inputs, each of the plurality of inputs selecting one of images representing sentence components displayed on a screen, the sentence components constituting a sentence to be outputted, wherein the sentence components comprise postpositions, conjugation of endings, and connectives;

a processor for combining, modifying, and/or rearranging the received sentence components to generate a sentence, wherein the received sentence components comprise one or more of the postpositions: and an output unit for outputting the generated sentence by voice, wherein input for at least one of the sentence components is performed by selection of an image coding a shape or meaning of a character, wherein a widget is created for the generated sentence.

6. The device of claim 5, wherein the processor stores the location where the output is performed and displays, in an order of frequency of use, sentences output within a predetermined distance from a location where the communication assistive device is located, based on data on the stored location.

7. The device of claim 6, wherein the displayed sentences include a combination of images representing sentence components.

8. The device of claim 5, wherein the image representing the sentence component is generated, modified, and/or deleted by a user.

9. A computer-readable recording device storing a program for causing a computer to execute the method of claim 1.

* * * * *